(12) United States Patent
Chen et al.

(10) Patent No.: US 8,114,497 B2
(45) Date of Patent: Feb. 14, 2012

(54) OPTICAL DISC AND MANUFACTURING METHOD THEREOF

(75) Inventors: Cheng-hsiung Chen, Hsinchu (TW); Chi-pin Kuo, Hsinchu (TW)

(73) Assignees: Princo Corp., Hsinchu (TW); Princo America Corp., Fremont, CA (US)

( * ) Notice: Subject to any disclaimer, the term of this patent is extended or adjusted under 35 U.S.C. 154(b) by 411 days.

(21) Appl. No.: 12/549,341

(22) Filed: Aug. 27, 2009

(65) Prior Publication Data
US 2010/0103809 A1 Apr. 29, 2010

(30) Foreign Application Priority Data
Oct. 28, 2008 (TW) .............................. 97141398 A

(51) Int. Cl.
*B32B 3/02* (2006.01)
(52) U.S. Cl. .................. 428/64.1; 428/64.4; 430/270.11
(58) Field of Classification Search .................. 428/64.4; 430/270.11
See application file for complete search history.

(56) References Cited

U.S. PATENT DOCUMENTS

| 6,515,098 B1 | 2/2003 | Hariharan et al. |
| 6,562,432 B2 | 5/2003 | Ogawa et al. |
| 2001/0044004 A1 | 11/2001 | Arakawa et al. |
| 2002/0018440 A1 | 2/2002 | Komaki et al. |

*Primary Examiner* — Elizabeth Mulvaney
(74) *Attorney, Agent, or Firm* — Pai Patent & Trademark Law Firm; Chao-Chang David Pai

(57) ABSTRACT

A method of manufacturing an optical disc comprises the steps of: (1) forming a substrate including an inner supporting section and an outer information recording section, the inner supporting section having a thickness larger than that of the outer information recording section; and (2) forming a vibration suppressing layer by printing UV curable paste three to five times over the surface of the non-recording side of the outer information recording section from an inner edge of the outer information recording section to a designated diameter, wherein the printed UV curable paste has a weight of 15% to 25% of the weight of the substrate, and at least 90% of the weight of the printed UV curable paste is distributed within a circular region with diameter 90 mm to 110 mm, each time the UV curable paste printed not exceeding 5% of the weight of the substrate.

14 Claims, 4 Drawing Sheets

OPTICAL DISC AND MANUFACTURING METHOD THEREOF

BACKGROUND OF THE INVENTION

1. Field of the Invention

The invention relates to an optical disc and a manufacturing method thereof, particularly to an optical disc with a printed vibration suppressing layer, and a manufacturing method thereof.

2. Description of Related Art

It is widely known that an optical disc, while being portable, can store a large amount of data in various different formats (e.g., video clips, music, documents, graphics), and it has become an important information storing means nowadays. The optical disc industry has been pursuing to manufacture low-cost, high read/write quality optical discs.

A conventional optical disc has a thickness of about 1.2 mm. As the manufacturing techniques advance, a material-saving optical disc having a thickness of only 0.6 mm has been disclosed in the literature. Generally, an optical disc rotates at a speed roughly between 2,400 and 3,600 rpm for reading or writing data. However, once the rotation speed exceeds 3,000 rpm for a faster access of data, vibration of the disc can occur. The vibration causes instability of the rotating disc, thus causing read/write problems. While the optical disc is made thinner, resulting in a lighter disc weight, the vibration will affect the optical disc even more. To reduce the vibration, a damping layer can be provided on the optical disc to reduce the duration affected by the vibration during operation. However, the related art does not disclose the best distribution region of the damping layer on the disc.

U.S. Pat. No. 5,458,940 and U.S. Pat. No. 6,461,711 provide solutions to the vibration problem mainly by using a damping layer provided over the recording layer of the optical disc to reduce the time affected by the vibration and to reduce the disc vibration amplitude. However, the damping layer can deform the disc, and the two aforementioned patents do not address this problem.

FIG. 1 is a schematic view of an optical disc having a damping layer. The optical disc 1 includes a substrate 13 and a damping layer 14. The substrate 13 includes an inner supporting section 11 and an outer information recording section 12, the former being thicker than the latter. The damping layer 14 is provided over the outer information recording section 12. The damping layer 14 may reduce the time the optical disc 1 is affected by the vibration and reduce the vibration amplitude of the disc. Namely, abating the instability of the disc to reduce the potential problems associated with the read/write operation. On the other hand, since the damping layer 14 and the substrate 13 are made of different materials, the bonding of the damping layer 14 to the substrate 13 results in a greater initial vertical deviation (abbreviated by "V.D." hereinafter) when there is a difference between the room temperature and the processing temperature. The V.D. has a positive value if the optical disc 1 warps upward from a reference plane; otherwise, the V.D. has a negative value if the optical disc 1 warps downward from the reference plane. A typical range of V.D. for allowing a proper read/write operation is between ±300 µm. If the V.D. of the optical disc 1 exceeds the allowable range, there could be a read/write problem. Besides, the deformation of the optical disc can increase with time under varying humidity and temperature (environmental testing), leaving the originally readable/writable disc inoperative. This means the optical disc will lose its read/write function or the read/write quality will deteriorate.

Moreover, the bonding process of the damping layer cannot be satisfactorily adjusted to optimize the characteristics of the damping layer. Consequently, although attaching a damping layer on an optical disc can reduce the disc vibration, it causes undesirable deformation of the disc. Furthermore, if spin coating process is used to form a damping layer, a long processing time and more materials are required.

In addition, although a damping layer can reduce the time a disc is affected by vibration, it has a limited improvement on the degree of the deformation because the damping layer is made of a soft material. Accordingly, Taiwan Patent Application No. 96130848 discloses an optical disc bonded with a deformation-rectifying layer on the opposite side of the recording layer so as to reduce the disc deformation. However, the deformation-rectifying layer needs additional processing time, which is disadvantageous to mass production of discs.

BRIEF SUMMARY OF THE INVENTION

To solve the problems such as deformation, vibration, long processing time, and material waste associated with optical discs mentioned above, the invention provides an improved manufacturing process to control the problems to gain several advantages such as improved read/write characteristics, faster processing, reduced cost, and no waste.

The invention provides a method of manufacturing an optical disc. The method includes the steps of: forming a substrate including an inner supporting section and an outer information recording section, the inner supporting section having a thickness greater than that of the outer information recording section; and forming a vibration suppressing layer by printing UV curable paste three to five times over a surface of a non-recording side of the outer information recording section from an inner edge of the outer information recording section to a designated diameter, wherein the printed UV curable paste has a total weight of 15% to 25% of the weight of the substrate, and at least 90% of the weight of the UV curable paste is distributed within a circular region with diameter 90 mm to 110 mm. In the method, it is preferable that the UV curable paste printed each time does not exceed 5% of the weight of the substrate.

The invention also discloses an optical disc manufactured by the method described above.

The invention further discloses another method of manufacturing an optical disc. The method includes the steps of: forming a substrate including an inner supporting section and an outer information recording section, the inner supporting section having a thickness larger than that of the outer information recording section; forming a first vibration suppressing layer by printing UV curable paste from an inner edge of the outer information recording section to a first designated diameter; and forming a second vibration suppressing layer by printing UV curable paste from the inner edge of the outer information recording section to a second designated diameter, wherein the first and the second vibration suppressing layers have a total weight of 20% to 30% of the weight of the substrate, and at least 90% of the total weight of the first and the second vibration suppressing layers is distributed within a circular region with diameter 90 mm to 110 mm.

The invention also discloses another optical disc manufactured by the method described above.

As illustrated in the embodiments of the invention, owing to the features of the printing process, it is easy to vary the printing weights or regions of the vibration suppressing layers such that the deformation of the printed optical disc can be controlled. In addition, since the outer information recording section has a thickness smaller than that of the inner supporting section, the manufacturing cost of an optical disc can be reduced. Moreover, the printing process is fast, and the material hardly goes into waste. Thus, there is no need to form an additional deformation-rectifying layer on the optical disc such that an optical disc having high read/write quality can be produced at low cost and high production yield.

BRIEF DESCRIPTION OF THE DRAWINGS

In the drawings, like reference numerals denote like elements or structures.

DETAILED DESCRIPTION OF THE INVENTION

Figure 1:
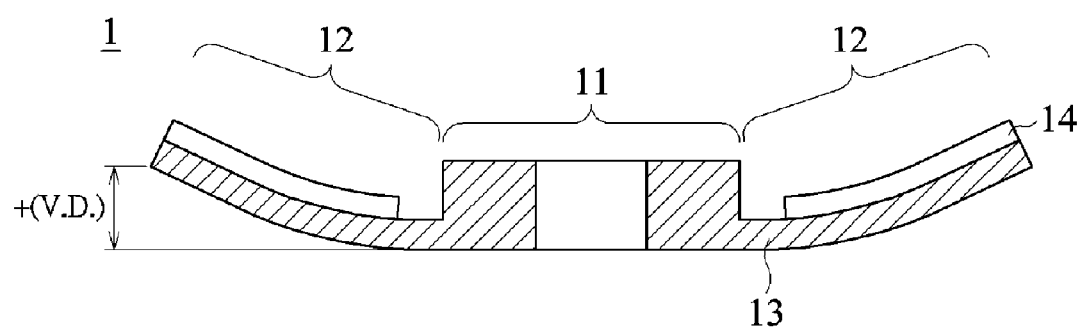
FIG. 1 is a structural cross-sectional view of a conventional optical disc.

The invention is now explained with reference to the drawings, in which like reference numerals denote like elements. A person skilled in the art will understand that certain details are used to explain the working principles of the invention but not to limit the scope of the invention. In addition, well known processes have not been described in detail in order not to unnecessarily obscure the invention.

In the embodiments described below, a printing diameter is obtained by respectively extending toward the periphery of an optical disc the same distance in opposite direction from the center of the optical disc (e.g. point in FIG. 5) to a desired diameter. Further, a "write failure" described herein means that an optical disc drive fails to perform a proper write operation mainly due to the deformation of a disc or the excessive vibration of a disc that causes the read/write head of an optical disc drive to operate improperly. An optical disc derived after a "write failure" has occurred will lose its original functions for reading or writing data.

I. First Embodiment

The first embodiment below explains a situation in which a printing region for a vibration suppressing layer is annular and the vibration suppressing layer is printed twice.

Figure 2:
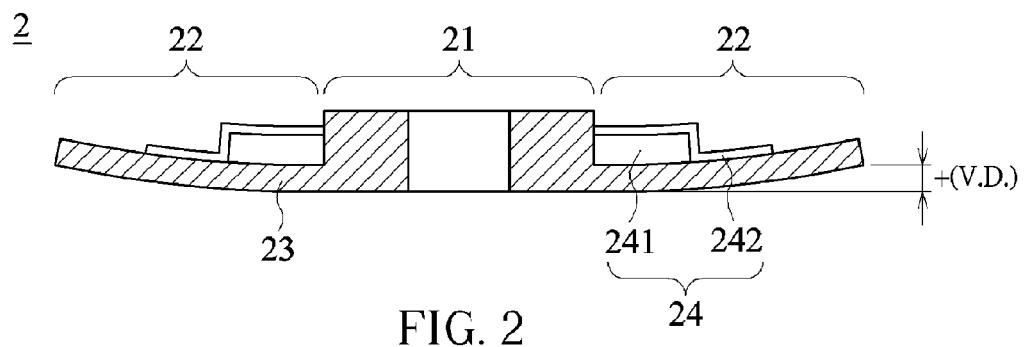
FIG. 2 is a structural cross-sectional view of an optical disc according to the first embodiment of the invention.

Referring to FIG. 2, first, a substrate 23 including an inner supporting section 21 and an outer information recording section 22 is prepared, the inner supporting section 21 having a thickness greater than that of the outer information recording section 22. Then, a first vibration suppressing layer 241 printing step is performed by printing UV curable paste from an inner edge of the outer information recording section 22 to a designated diameter. Next, a second vibration suppressing layer 242 printing step is performed by printing UV curable paste from the inner edge of the outer information recording section 22 to another designated diameter. In the first embodiment, the vibration suppressing layer 24 (including the first vibration suppressing layer 241 and the second vibration suppressing layer 242) of each optical disc 2 has the following common conditions: the total weight of the vibration suppressing layer 24 being about 2.5 g (about 28% of the weight of the substrate 23); and the total thickness of the vibration suppressing layer 24 ranging from about 0.15 mm to 0.4 mm.

Referring to Table 1 below, eight groups of different printing conditions are used to print the vibration suppressing layer 24 on each optical disc 2. Here, an optical disc using the printing conditions group 3 (hereinafter "group 3 disc") serves as an example of two-layered printing. Referring to FIG. 2, the first vibration suppressing layer printing step prints UV curable paste whose weight is about 90% of the weight of the vibration suppressing layer 24 in a circular region with diameter 65 mm to form a first vibration suppressing layer 241. The second vibration suppressing layer printing step prints UV curable paste whose weight is about 10% of the weight of the vibration suppressing layer 24 in a circular region with diameter 95 mm to form a second vibration suppressing layer 242. Therefore, the two-layered suppressing layer 24 is formed, and the second vibration suppressing layer 242 covers the first vibration suppressing layer 241.

Figure 3:
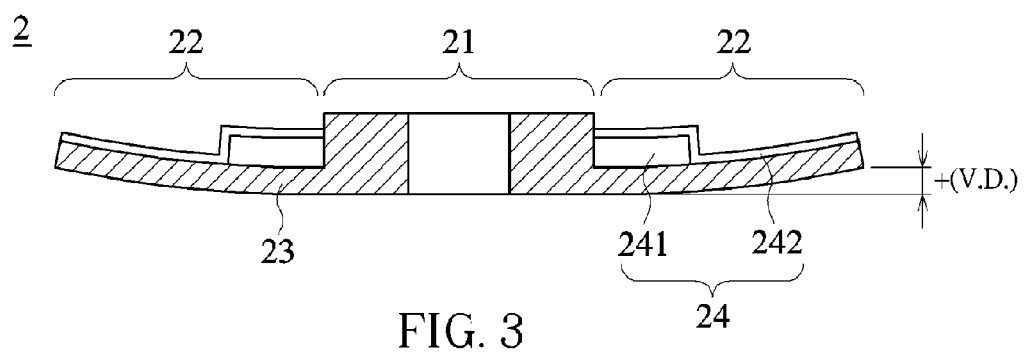
FIG. 3 is another structural cross-sectional view of an optical disc according to the first embodiment of the invention.
Figure 4:
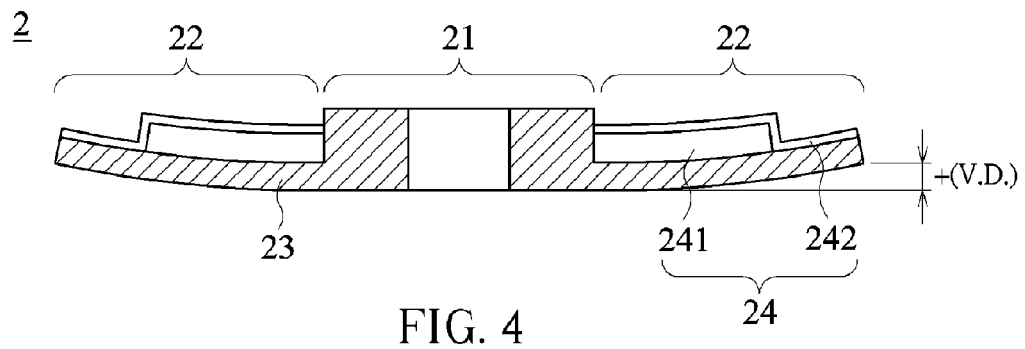
FIG. 4 is yet another structural cross-sectional view of an optical disc according to the first embodiment of the invention.

In the embodiment, the vibration suppressing layers 24 of group 3 disc (the structure can be seen from FIG. 2), group 4 disc (the structure can be seen from FIG. 3), and group 8 disc (the structure can be seen from FIG. 4) each has a two-layered structure 24 including a first vibration suppressing layer 241 and a second vibration suppressing layer 242, whose weights are about 90% and 10% of the total weight of the two-layered structure respectively. The group 2 and group 7 discs each has a two-layered structure including a first vibration suppressing layer and a second vibration suppressing layer, whose weights are about 70% and 30% of the total weight of the two-layered structure respectively. The group 1, group 5, and group 6 discs each has a two-layered structure including a first vibration suppressing layer and a second vibration suppressing layer, whose weights are about 50% and 50% of the total weight of the two-layered structure respectively.

Next, an optical disc drive is used to write an optical disc, the performance of an optical disc is rated on a maximum score of 100 based on the measurement results of Parity of the Inner code Error (PIE), Parity of the Inner code Failure (PIF), Parity of the Outer code Error (POE), and Parity of the Outer code Failure (POF) for the optical disc. A score of zero indicates that the optical disc drive cannot read any data from an optical disc, and a score of over 50 indicates that the optical disc drive can correctly read and decode data despite some errors exist in an optical disc.

The various printing conditions including printing diameters and printing weight percentages, and scores based on the measurement results as described above for optical discs are shown in Table 1 below.

TABLE 1

| Group | Designated diameter | | | Write result | Score |
| | 65 mm | 95 mm | 115 mm | | |
| --- | --- | --- | --- | --- | --- |
| 1 | 50.0% | 50.0% | 0.0% | Write failure | 0 |
| 2 | 70.0% | 30.0% | 0.0% | Accessible | 0 |

TABLE 1-continued

| Group | Designated diameter | | | Write result | Score |
| --- | --- | --- | --- | --- | --- |
| | 65 mm | 95 mm | 115 mm | | |
| 3 | 90.0% | 10.0% | 0.0% | Accessible | 45 |
| 4 | 90.0% | 0.0% | 10.0% | Accessible | 80 |
| 5 | 50.0% | 0.0% | 50.0% | Write failure | 0 |
| 6 | 0.0% | 50.0% | 50.0% | Write failure | 0 |
| 7 | 0.0% | 70.0% | 30.0% | Accessible | 0 |
| 8 | 0.0% | 90.0% | 10.0% | Accessible | 73 |

Note:
The value "0.0%" means that the printing process is either not terminating or not reaching the corresponding designated diameter.
For groups 1, 2, and 3, there is no more printing beyond 95 mm.
For groups 4 and 5, the printing of one of the layers does not stop at 95 mm but continues to reach 115 mm.
For groups 6, 7, and 8, the printing of both layers does not stop at 65 mm but continues to reach 95 mm and 115 mm respectively.

As can be seen from the scores in Table 1, the optical discs derived by the printing conditions group 3, group 4, and group 8 turn out to be preferable products. It can be inferred that, when two printing steps are performed, it is preferable that the first vibration suppressing layer printing step prints 90% of the weight of the whole vibration suppressing layer material in a circular region with diameter 65 mm, and the second vibration suppressing layer printing step prints the remaining weight percentage of the whole vibration suppressing layer material in a circular region with diameter 95 mm or 115 mm. Alternatively, it is preferable that the first vibration suppressing layer printing step prints 90% of the weight of the whole vibration suppressing layer material in a circular region with diameter 95 mm, and the second vibration suppressing layer printing step prints the remaining weight percentage of the whole vibration suppressing layer material in a circular region with diameter 115 mm.

As a person skilled in the art can understand, the first vibration suppressing layer printing step and the second vibration suppressing layer printing step should not be limited in any specific order but are just indicative of their respective printing weights.

II. Second Embodiment

The second embodiment below explains a situation in which a printing region for a vibration suppressing layer is non-annular and the vibration suppressing layer is printed once or multiple times.

Figure 5:
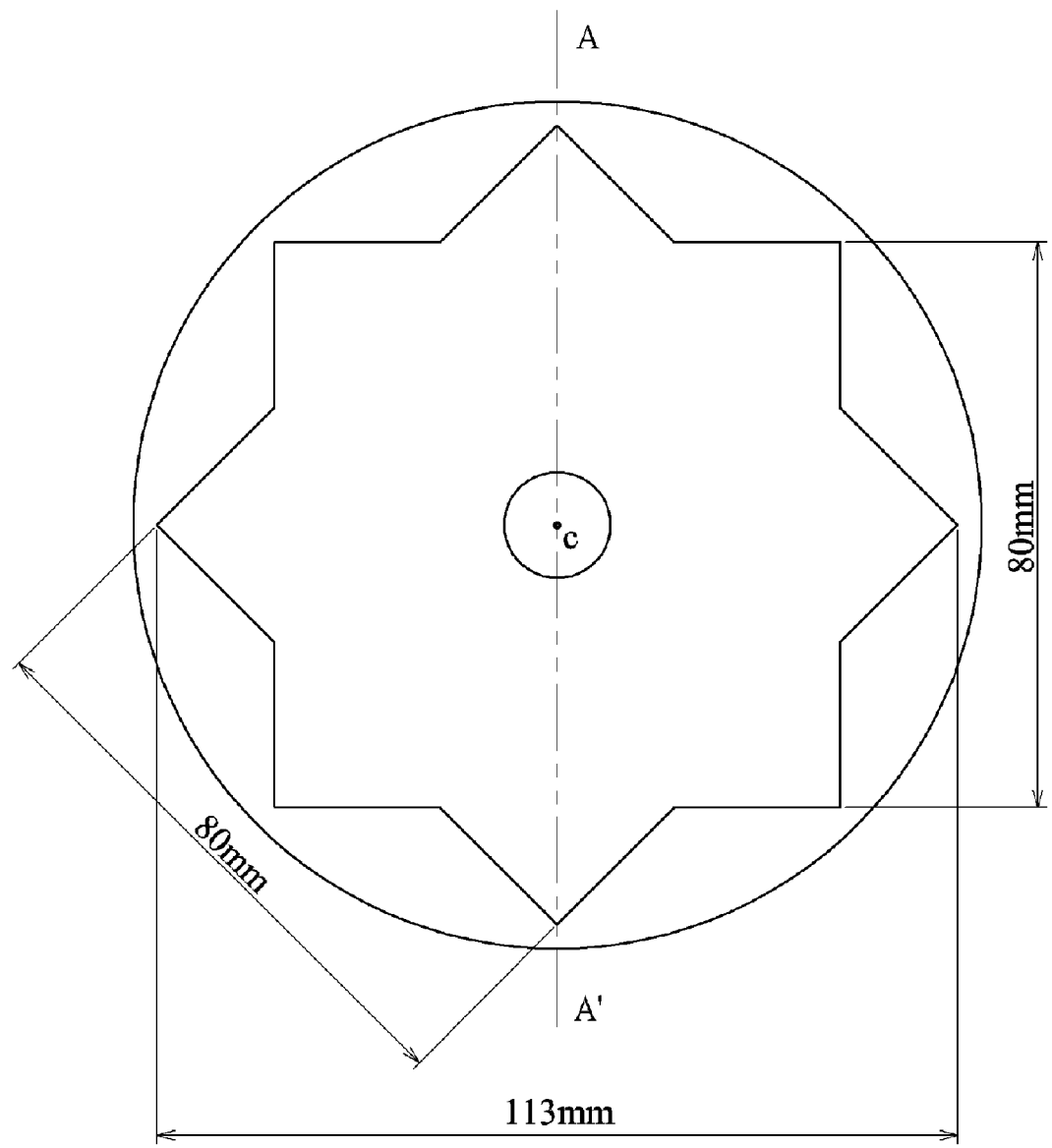
FIG. 5 is a plan view showing the printing range on an optical disc according to the second embodiment of the invention.
Figure 6:
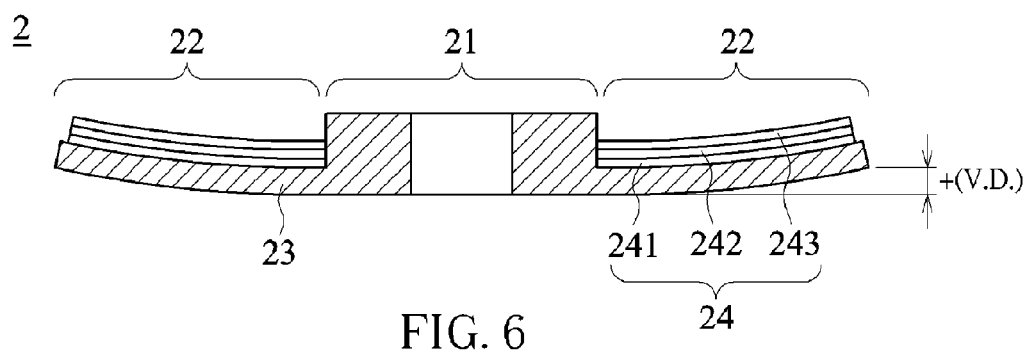
FIG. 6 is a structural cross-sectional view of an optical disc cut along the line A-A' in FIG. 5 according to the second embodiment of the invention.
Figure 7:
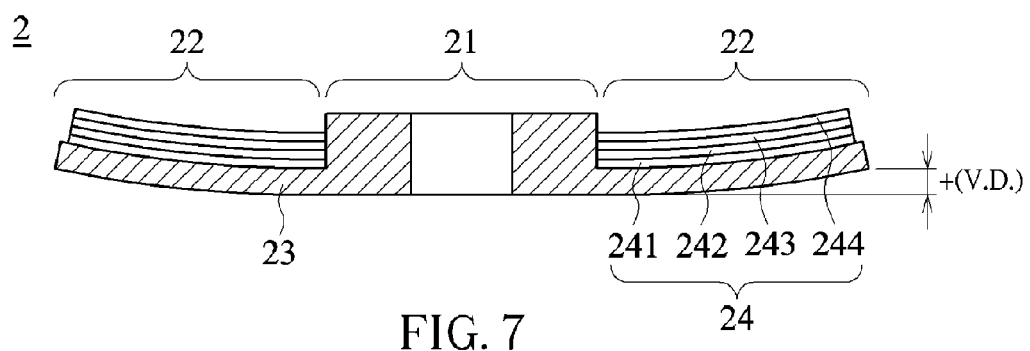
FIG. 7 is another structural cross-sectional view of an optical disc cut along the line A-A' in FIG. 5 according to the second embodiment of the invention.

Referring to FIG. 6, first, a substrate 23 including an inner supporting section 21 and an outer information recording section 22 is prepared, the inner supporting section 21 having a thickness greater than that of the outer information recording section 22. Then, a vibration suppressing layer 24, including a first vibration suppressing layer 241, a second vibration suppressing layer 242, and a third vibration suppressing layer 243, is printed over the surface of the non-recording side of the outer information recording section 22. In FIG. 7, the manufacturing process of the optical disc 2 as shown is similar to that in FIG. 6, the only difference being that the vibration suppressing layer is printed once more. Namely, the vibration suppressing layer 24 includes a first vibration suppressing layer 241, a second vibration suppressing layer 242, a third vibration suppressing layer 243, and a fourth vibration suppressing layer 244. The material used for the vibration suppressing layer 24 in the second embodiment is pure UV curable paste. As compared with the first embodiment, the printing region of the second embodiment, as shown in FIG. 5, is not annular, but of a shape formed by two partially overlapping squares having a side of 80 mm. In this embodiment, the maximum printing diameter measures 113 mm because the square has a side of 80 mm, and it is estimated that the vibration suppressing layer 24 has about 90% to 93% of its total weight printed within the printing diameter of 95 mm.

Table 2 shows printing conditions groups 1~5 having different printing times and printing weights. The varied weights of groups 1~5 are achieved by printing with different times respectively. Namely, under printing conditions for group 1, a vibration suppressing layer having 5.0% (0.45 g) of the weight of the substrate 23 is printed once. Under printing conditions for group 2, the vibration suppressing layer is printed twice, each time printing the vibration suppressing layer having 5.0% of the weight of the substrate 23. Namely, the total weight of the vibration suppressing layer for group 2 is 10% of the weight of the substrate 23. Likewise, under printing conditions for group 3 and group 4, the vibration suppressing layers are printed three and four times respectively, each time printing the vibration suppressing layer having 5.0% of the weight of the substrate 23. Namely, the total weight of the vibration suppressing layer for group 3 is 15% of the weight of the substrate 23, and the total weight of the vibration suppressing layer for group 4 is 20% of the weight of the substrate 23. FIG. 6 is a structural cross-sectional view cut along line A-A' of FIG. 5, which shows the optical disc 2 under printing conditions for group 3, wherein a first vibration suppressing layer 241, a second vibration suppressing layer 242, and a third vibration suppressing layer 243 are printed sequentially. FIG. 7 is a structural cross-sectional view cut along line A-A' of FIG. 5, which shows the optical disc 2 under printing conditions for group 4, wherein a first vibration suppressing layer 241, a second vibration suppressing layer 242, a third vibration suppressing layer 243, and a fourth vibration suppressing layer 244 are printed sequentially.

The printed optical discs of all the groups are written using an optical disc drive. Each group consists of ten optical discs for writing. The written discs have their measurements of PIE, PIF, POE, POF recorded to serve as evaluation criteria for the discs to be rated on a maximum score of 100.

Table 2 shows the average scores of the tested optical discs. Any disc experiencing the "write failure" is excluded from scoring.

TABLE 2

| Group | Printing times and printing weight % | | Write result | Average score (excluding "write failure" discs) | Average V.D. after printed (μm) | Average V.D. after environment testing (μm) |
| --- | --- | --- | --- | --- | --- | --- |
| 1 | Once | 5.0% (0.45 g) | "write failure" discs: 7 | 0 | 137 | 210 |
| 2 | Twice | 10.0% (0.9 g) | "write failure" discs: 3 | 52 | 226 | 240 |

TABLE 2-continued

| Group | Printing times and printing weight % | | Write result | Average score (excluding "write failure" discs) | Average V.D. after printed (μm) | Average V.D. after environment testing (μm) |
|---|---|---|---|---|---|---|
| 3 | Three times | 15.0% (1.35 g) | Accessible | 70 | 150 | 113 |
| 4 | Four times | 20.0% (1.8 g) | Accessible | 40 | −48 | −123 |
| 5 | Once | 15.0% (1.35 g) | "write failure" discs: 5 | 62 | 321 | 393 |

As can be seen from Table 2, group 3 and group 4 include no "write failure" discs and have a smaller V.D.

For a group 5 disc, as compared to a group 3 disc, the vibration suppressing layer having 15.0% (1.35 g) of the weight of the substrate 23 is printed once. Although the vibration suppressing layer of a group 5 disc weighs about the same as the vibration suppressing layer of a group 3 disc, the V.D. of a group 5 disc measured after printing and environmental testing is larger than that of a group 3 disc. Besides, the write result of a group 5 disc is not good. From above, the best implementation is that the vibration suppressing layer, which weighs about 15% of the weight of the substrate 23, is achieved by printing three times, each time printing 5% of the weight of the substrate 23. Alternatively, the vibration suppressing layer, which weighs about 20% of the weight of the substrate 23, is achieved by printing four times, each time printing 5% of the weight of the substrate 23.

III. Third Embodiment

The third embodiment combines the technical features of the first and the second embodiments, illustrating an example in which a printing region for a vibration suppressing layer is annular and the vibration suppressing layer is printed multiple times in separate regions.

Figure 8:
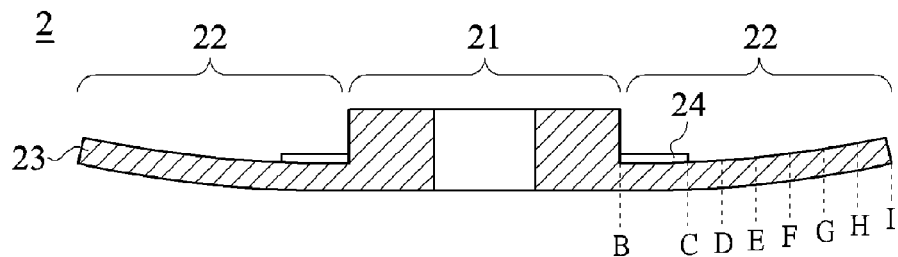
FIG. 8 is a schematic cross-sectional view showing the printing range on an optical disc according to the third embodiment of the invention.

As shown in FIG. 8, first, a substrate 23 including an inner supporting section 21 and an outer information recording section 22 is prepared, the inner supporting section 21 having a thickness greater than that of the outer information recording section 22. Then, a vibration suppressing layer 24 is printed over the surface of the non-recording side of the outer information recording section 22. The vibration suppressing layer 24 is uniformly printed in an annular region over the surface and from an inner edge of the non-recording side of the outer information recording section to a designated diameter. In FIG. 8, point indicates the inner edge of the non-recording side of the outer information recording section 22, and points C, D, E, F, G, H, and I indicate locations corresponding to diameters 60 mm, 70 mm, 80 mm, 90 mm, 100 mm, 110 mm, and 120 mm respectively, and point I is also the outer edge of the optical disc 2. Each time 0.4 g (about 4.8% of the weight of the substrate 23) of the vibration suppressing layer material is printed. The total weight of the vibration suppressing layer material used varies from 0.4 g to 2.4 g. Hence in Table 3, printing 0.8 g of the vibration suppressing layer material means printing twice, printing 1.2 g of the vibration suppressing layer material means printing three times, and so on. As shown in FIG. 8, the optical disc 2 is printed with a vibration suppressing layer 24 having 0.4 g of the printing material in a printing region of 60 mm diameter. In this embodiment, the vibration suppressing layer 24 is pure UV curable paste.

Next, optical discs 2 with vibration suppressing layers derived from various printing diameters and printing times are written. For each group of 40 optical discs under the same printing condition, "write failure" discs being no more than two is acceptable. Namely, a failure rate of not exceeding 5% is acceptable.

Table 3 shows the number of "write failure" discs for each group of printing conditions.

TABLE 3

| Printing weight | Printing diameter | | | | | | |
|---|---|---|---|---|---|---|---|
| | 60 mm | 70 mm | 80 mm | 90 mm | 100 mm | 110 mm | 120 mm |
| 0.4 g (4.8%) | 30 | 30 | 23 | 22 | 19 | 25 | 30 |
| 0.8 g (9.6%) | 30 | 30 | 21 | 7 | 4 | 5 | 10 |
| 1.2 g (14.5%) | 31 | 31 | 9 | 0 | 1 | 2 | 8 |
| 1.6 g (19.3%) | 30 | 30 | 12 | 1 | 0 | 1 | 7 |
| 2.0 g (24.1%) | 31 | 20 | 4 | 2 | 1 | 1 | 3 |
| 2.4 g (28.9%) | 30 | 17 | 4 | 2 | 0 | 4 | 4 |

For all the optical discs tested above, the V.D. representing the deformation of an optical disc falls within a range between ±300 μm, and it also falls within the ±300 μm range after environmental tests are performed to the discs. As can be seen from above, in the case that printing is performed only once or twice (0.4 or 0.8 g of the vibration suppressing layer 24), no valid disc can be produced whatever the designated diameter is. In the case that printing is performed three to five times (1.2 to 2.0 g of the vibration suppressing layer 24), only the designated diameters of 90 mm, 100 mm, and 110 mm can produce valid results. In the case that printing is performed six times (2.4 g of the vibration suppressing layer 24), only the designated diameters of 90 and 100 mm produce valid results.

Therefore, in the case that printing is performed three to five times, it is preferable to print within a designated diameter of 90 to 110 mm and each layer is 4.8% of the weight of the substrate 23. In the case that printing is performed six times, it is preferable to print within a designated diameter of 90 to 100 mm and each layer is 4.8% of the weight of the substrate 23.

Comparative Experiment

A comparative experiment is set up to form a vibration suppressing layer 24 by performing spin coating on an optical disc 2. Referring to FIG. 2, first, a substrate 23 including an inner supporting section 21 and an outer information recording section 22 is prepared, the inner supporting section 21 having a thickness greater than the outer information recording section 22. Then, a vibration suppressing layer 24 is formed over the surface of the non-recording side of the outer information recording section 22 by using the spin coating method. The spin-coated vibration suppressing layer 24 has a thickness of 0.15 mm. The amount of paste provided on the disc during the spin-coating process is about 2 ml (about 2 g), and the vibration suppressing layer weighs 18% (about 1.5 g) of the substrate 23, which means the loss ratio is about 25%. The time to perform spin coating on the disc takes about 7.5 seconds.

The spin coating method has to coat over an entire surface, but not arbitrarily over local regions on the surface, of the non-recording side of the outer information recording section 22. On the contrary, the invention allows printing a vibration suppressing layer having the same thickness and area by using the same amount of paste weighing 2 g with a processing time of 1 second. Thus, the invention not only significantly increases the production per unit time, but also wastes no material.

As can be seen from the comparison of the embodiments to the control experiment, the vibration and deformation of the optical disc can be reduced and the quality and performance of the read/write characteristics can be enhanced by adjusting the printing diameter, the printing times, and the printing weight of the vibration suppressing layer. In addition, the invention has several advantages by using the printing process, such as faster processing, higher yield, and no waste.

What is claimed is:

1. A method of manufacturing an optical disc, comprising the steps of:
    forming a substrate including an inner supporting section and an outer information recording section, the inner supporting section having a thickness greater than that of the outer information recording section; and
    forming a vibration suppressing layer by printing UV curable paste over a surface of a non-recording side of the outer information recording section from an inner edge of the outer information recording section to a designated diameter,
    wherein the UV curable paste printed has a total weight of 15% to 25% of the weight of the substrate, and at least 90% of the weight of the UV curable paste is distributed within a circular region with diameter 90 mm to 110 mm.

2. The method of claim 1, wherein the vibration suppressing layer is annular.

3. The method of claim 1, wherein the vibration suppressing layer is formed by printing three to five times, each time the UV curable paste printed not exceeding 5% of the weight of the substrate.

4. The method of claim 2, wherein the vibration suppressing layer is formed by printing three to five times, each time the UV curable paste printed not exceeding 5% of the weight of the substrate.

5. An optical disc manufactured by the method of claim 1.

6. An optical disc manufactured by the method of claim 2.

7. An optical disc manufactured by the method of claim 3.

8. An optical disc manufactured by the method of claim 4.

9. A method of manufacturing an optical disc, comprising the steps of:
    forming a substrate including an inner supporting section and an outer information recording section, the inner supporting section having a thickness larger than that of the outer information recording section;
    forming a first vibration suppressing layer by printing UV curable paste from an inner edge of the outer information recording section to a first designated diameter; and
    forming a second vibration suppressing layer by printing UV curable paste from the inner edge of the outer information recording section to a second designated diameter,
    wherein the first and the second vibration suppressing layers have a total weight of 20% to 30% of the weight of the substrate, and at least 90% of the total weight of the first and the second vibration suppressing layers is distributed within a circular region with diameter 90 mm to 110 mm.

10. The method of claim 9, wherein either the first or the second vibration suppressing layer is printed to a diameter of 65 mm and has a weight that is 90% of the total weight of the vibration suppressing layers.

11. The method of claim 9, wherein either the first or the second vibration suppressing layer is printed to a diameter of 95 mm and has a weight that is 90% of the total weight of the vibration suppressing layers.

12. An optical disc manufactured by the method of claim 9.

13. An optical disc manufactured by the method of claim 10.

14. An optical disc manufactured by the method of claim 11.

* * * * *